United States Patent [19]
Tyan

[11] Patent Number: 5,463,914
[45] Date of Patent: Nov. 7, 1995

[54] MULTI-FUNCTION ENERGY SAVING POWER TRANSMISSION MECHANISM

[76] Inventor: Li Yng Tyan, No. 4, Alley 31, Ln. 88, Kao Shuang Rd., Taoyuan Hsien, Taiwan

[21] Appl. No.: 190,446

[22] Filed: Feb. 2, 1994

[51] Int. Cl.⁶ .............................. F16H 1/22; F16H 37/14
[52] U.S. Cl. ..................... 74/661; 74/414; 74/421 A; 74/665 E
[58] Field of Search .................. 74/414, 421 A, 74/661, 665 A, 665 B, 665 E; 475/151, 152

[56] References Cited

U.S. PATENT DOCUMENTS

| | | | |
|---|---|---|---|
| 2,463,349 | 3/1949 | Baner | 74/421 A X |
| 3,533,484 | 10/1970 | Wood | 74/665 A X |
| 3,958,465 | 5/1976 | Hiersig et al. | 74/665 A X |
| 4,177,693 | 12/1979 | Ivanko et al. | 74/665 A X |
| 4,274,302 | 6/1981 | Herscovici | 74/665 B X |
| 4,825,727 | 5/1989 | Komuro | 74/421 A X |
| 4,951,261 | 8/1990 | Strehlow | 74/421 A X |
| 5,135,422 | 8/1992 | Bossler, Jr. | 74/665 B X |

Primary Examiner—Rodney H. Bonck
Assistant Examiner—Nathan O. Jensen
Attorney, Agent, or Firm—Browdy and Neimark

[57] ABSTRACT

A multi-functional energy saving power transmission mechanism has a plurality of miniature motors assembled together into a motor assembly, a down-speed gear set and an output gear set. More than one down-speed gear set can be arranged in sequence for further reducing the speed of the motor assembly and generate a larger torque output. Each down-speed gear set has a gear mounting block with a main central driving shaft. One end of the shaft has a spur gear or an annular gear and the other end has a spur gear. The gear mounting block also has a plurality of gear mounting holes disposed around the central driving shaft. A plurality of minor driving shafts can be selectively engaged with the gear mounting holes so as to make the driving connection between the down-speed gear sets or to the output gear set in a smoother manner. The motor assembly mounting block and the gear mounting blocks of the down-speed and the output gear sets can be integrally molded together in advance in any number or in different shapes by injection molding. Any number of motor assemblies each having a plurality of miniature motors can be coupled together by a coupling member having a couping joint at one end and an annular gear or a spur gear at the other end so as to effectively boost up the power output thereof.

19 Claims, 16 Drawing Sheets

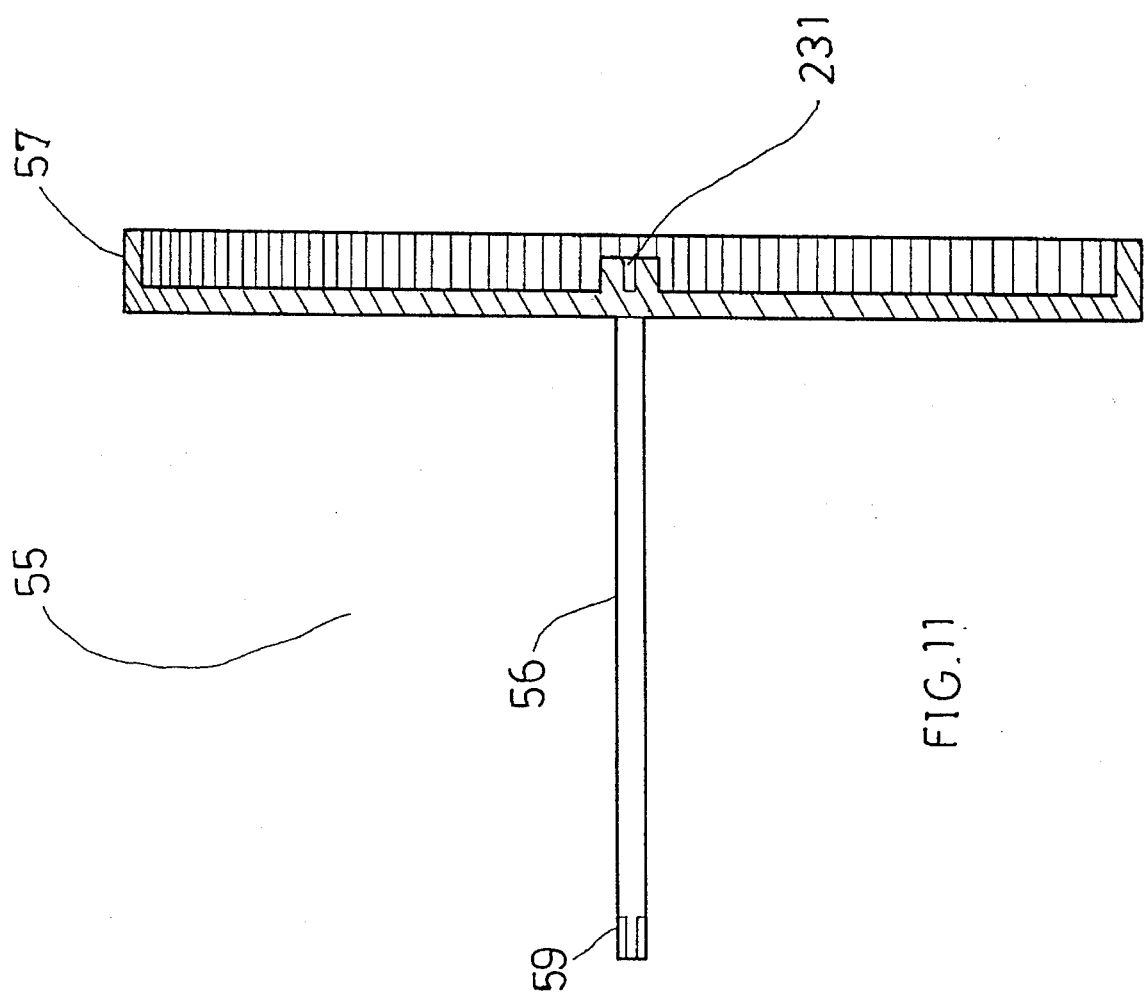

5,463,914

MULTI-FUNCTION ENERGY SAVING POWER TRANSMISSION MECHANISM

BACKGROUND OF THE INVENTION

The present invention relates to a power transmission mechanism and particularly to an energy saving driving system which is powered by one or more miniature motor assemblies each of which can be comprised of a different number of motors. As we know, a miniature motor consumes very little electrical power and operates at relatively high speed, at least 4000 rpm. The present transmission mechanism can convert a high speed/small torque power into a relatively low speed/large torque power driving so that the present invention can be applied to many motor driving appliances such as electric fans, refrigerators, air conditioners, washers and even electric automobiles or motor bicycles with the electric energy consumption greatly reduced.

Generally speaking, common electric appliance such as refrigerators, air conditioners, washers, are driven by 110 V or 220 V heavy duty motors which generally operate at low speed, 2000–3000 rpm and produce relatively large torque; however, such conventional motors consume relatively large electric energy and produce much noise and heat in operation. The use of such heavy duty motors are intended to produce necessary driving torques to actuate the associated mechanism.

There is much electrical energy wasted in the form of heat in the windings of such. There is also much noise and vibration in the practical operation of these conventional motors.

SUMMARY OF THE INVENTION

The primary object of the present invention is to provide a multi-function energy saving power transmission mechanism which is powered by any number of miniature high speed motors as preferred.

Another object of the present invention is to provide a multi-function energy saving power transmission mechanism which can be powered by a plurality of miniature high speed motors arranged in one or more motor assemblies.

One further object of the present invention is to provide an energy saving power transmission mechanism which is basically equipped with at least one motor assembly in engagement with one down-speed gear set and a power output gear set connected to a common motor-driven device.

One further object of the present invention is to provide an energy saving power transmission mechanism wherein each down-speed gear set is equipped with a main driving shaft. One end of the driving shaft having mounted thereon an annular gear or a spur gear and the other end having a spur gear.

One further object of the present invention is to provide an energy saving power transmission mechanism wherein the main driving shaft is supported by a mounting block. On the mounting block are defined a plurality of mounting holes. This permits a plurality of idle driving gears to be engaged with the spur gear at one end of the main driving shaft of the down-speed gear set to be selectively secured to the mounting block. This makes the driving operation of the driving shaft smoother.

One still further object of the present invention is to provide an energy saving power transmission mechanism wherein each of the down-speed gear set is mounted to a mounting block respectively so that the number of gear sets adapted for different operational requirements can be easily varied accordingly.

One still further object of the present invention is to provide a power transmission mechanism wherein more than one motor assembly, each including more than one miniature motor, can be coupled together by a coupling means, permitting the motor assemblies to simultaneously output power to meet different operational driving requirements.

One still further object of the present invention is to provide an energy saving power transmission mechanism wherein gear mounting blocks can be integrally assembled together as one in advance by injection molding with gear members readily mounted thereto and dismounted therefrom if desired.

One still further object of the present invention is to provide an energy saving power transmission mechanism wherein the motor mounting blocks and the gear mounting blocks of the down-speed gear sets and output gear set can be integrally molded together in advance in any number and in various shapes so as to meet different working conditions.

BRIEF DESCRIPTION OF THE DRAWINGS

FIG. 11 is a diagram showing the structure of the coupling means;

DETAILED DESCRIPTION OF THE PREFERRED EMBODIMENTS

Figure 1:
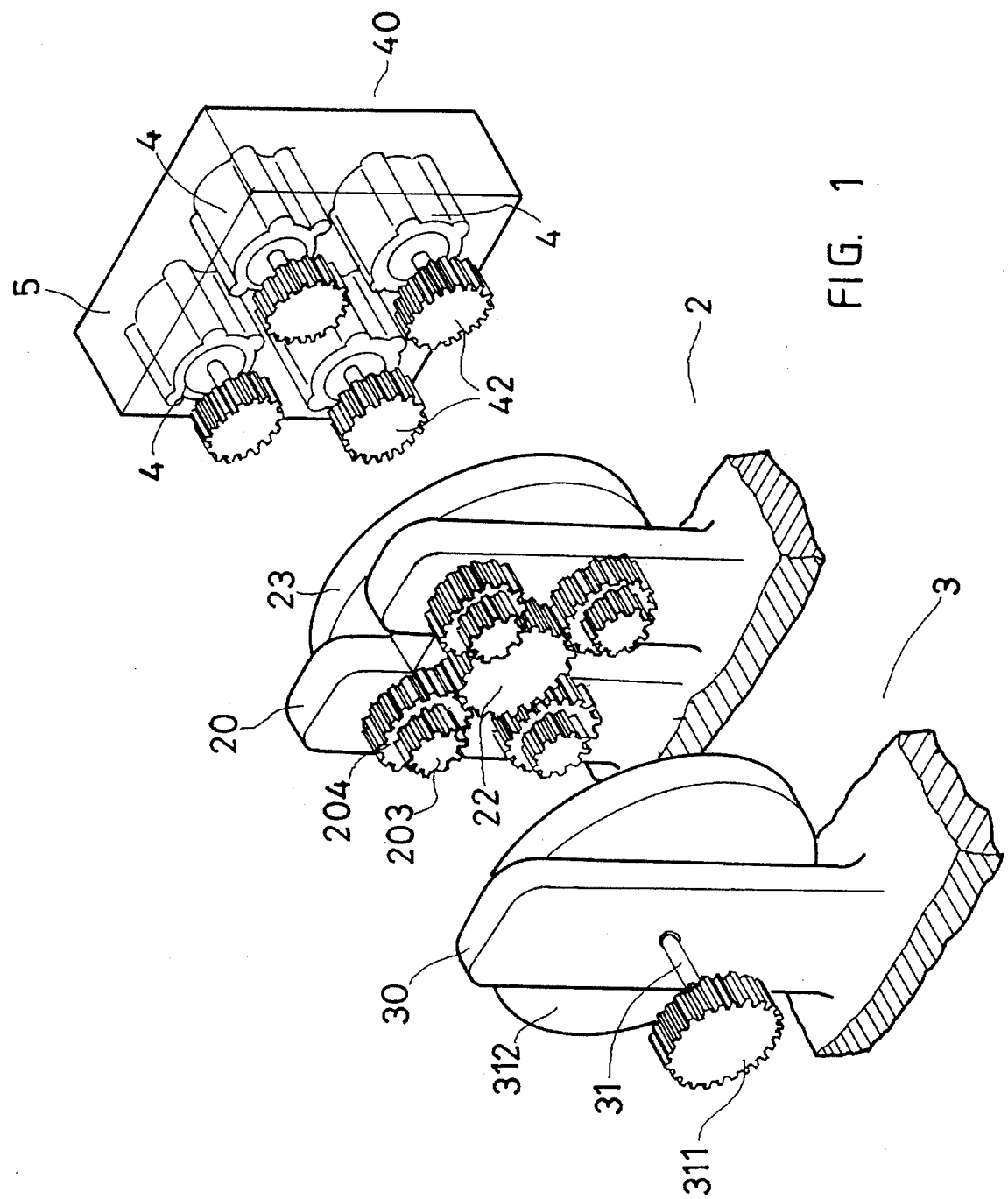
FIG. 1 is a perspective diagram showing the basic components of the present invention.
Figure 2:
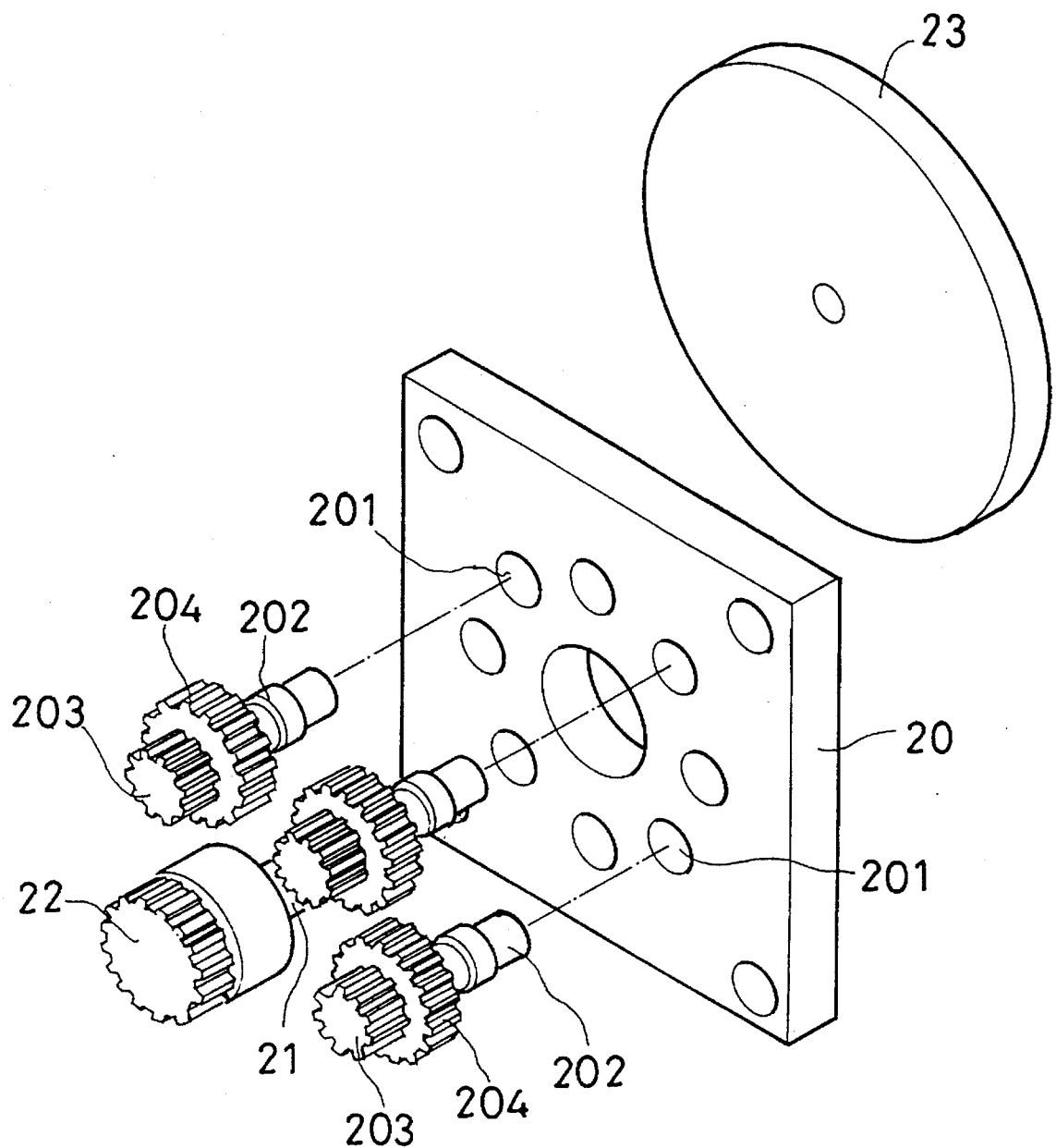
FIG. 2 is a perspective diagram showing the structure of a down-speed gear set.
Figure 2A:
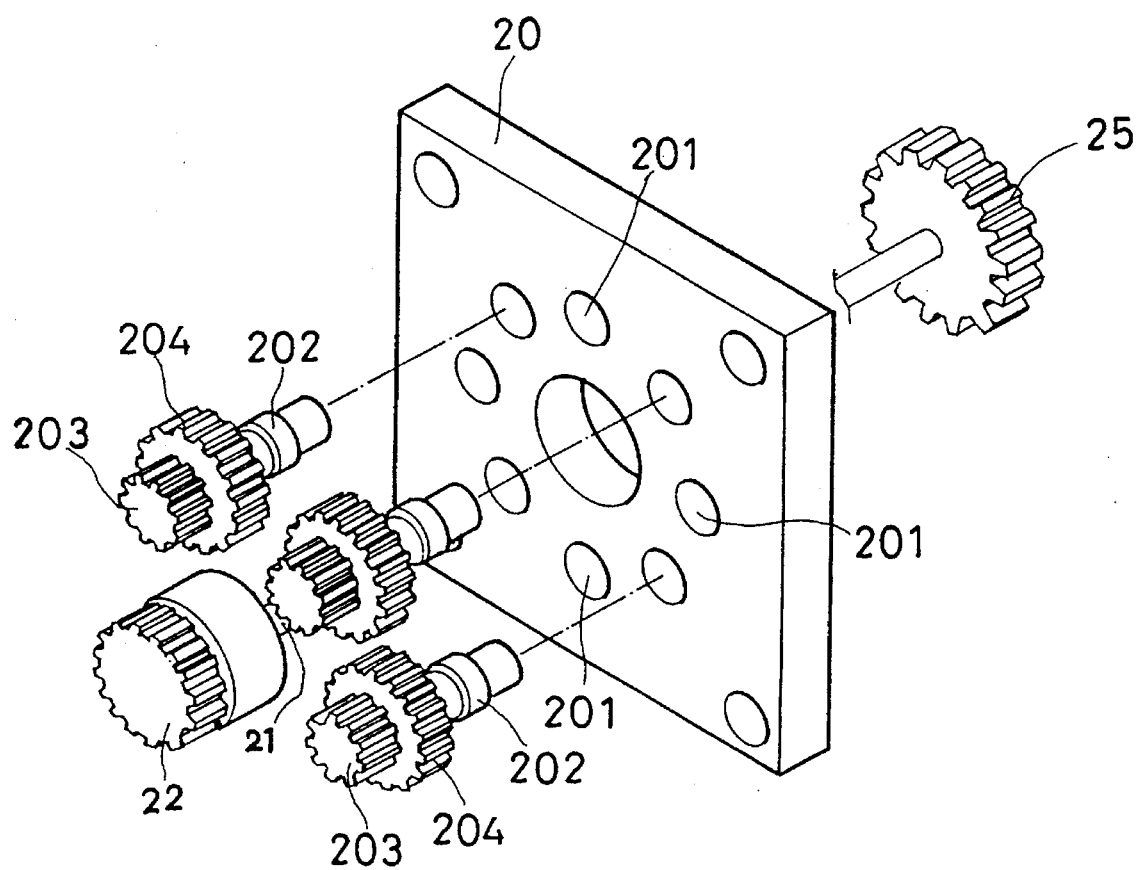
FIG. 2A is a perspective diagram showing another structure of a down-speed gear set.

Referring to FIG. 1, 2 and 2A the present invention is basically comprised of at least a down-speed gear set 2 and an output gear set 3, and a plurality of miniature electric motors 4 which can be selectively assembled together in any number.

The down-speed gear set 2 is equipped with a gear mounting block 20 having a main driving shaft 21 disposed at the center thereof. One end of the main driving shaft 21 is provided with a second gear means which can be an annular gear 23 or a spur gear 25 (see FIG. 2A) and the other end is provided with a first gear means which is a spur gear 22.

A plurality of symmetric mounting holes 201 are defined on the mounting block 20 so as to permit a number of minor driving shaft 202 to be selectively mounted to the mounting holes 201 in order to make the operation of the main driving shaft 21 to be as smooth as possible.

Each of the minor driving shafts 202 is provided with a first idle gear 203 and a second idle gear 204 having different or identical diameter .and teeth number. The size and number of teeth thereof can be varied by easy replacement of the minor driving shafts 202 so as to meet different operation requirements.

The output gear set 3 is made up of a mounting block 30 and a main output shaft 31 having one end thereof attached with a spur gear 311 and the opposite end with an annular gear 312.

Figure 6:
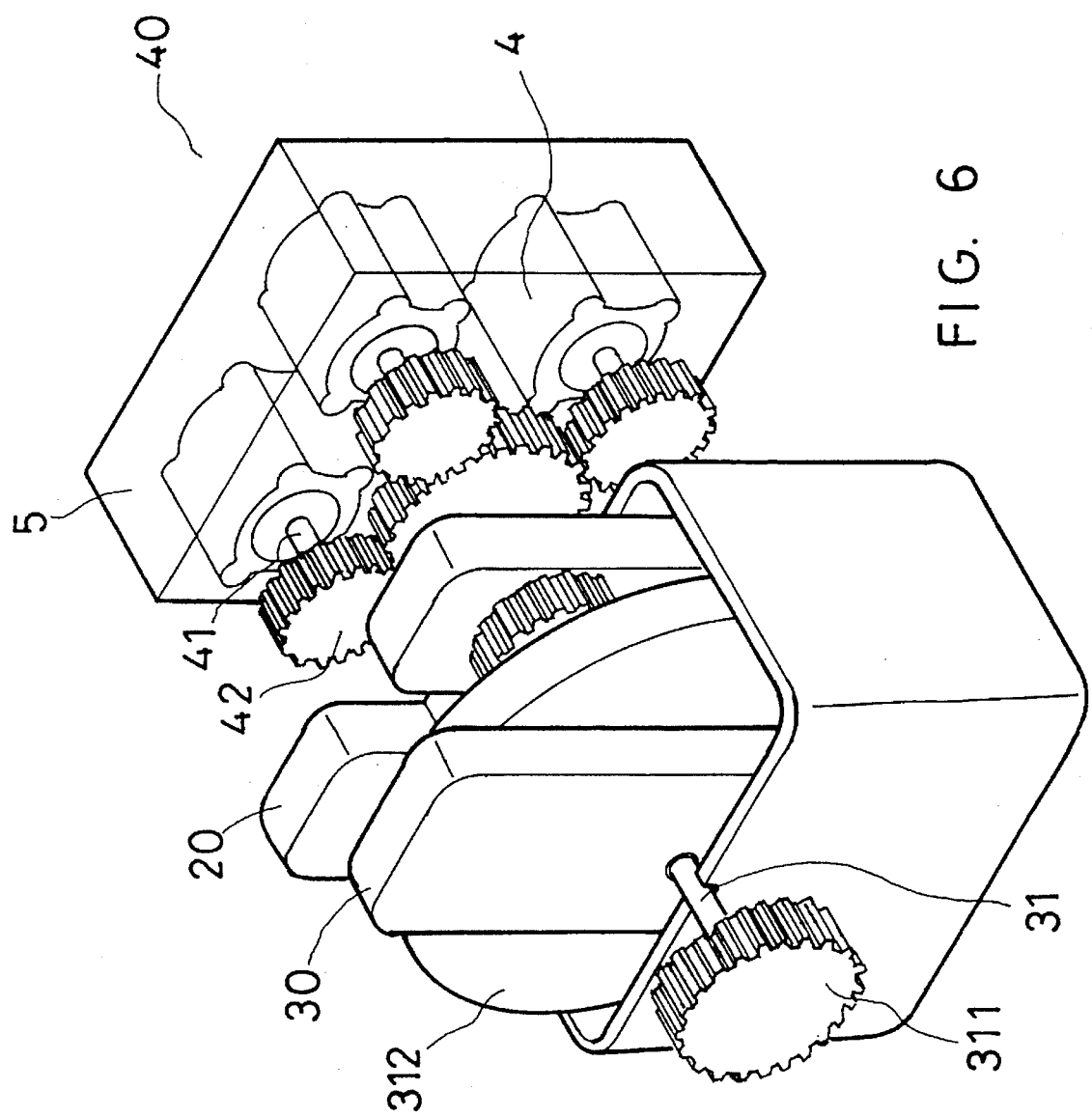
FIG. 6 is a diagram showing an integrally molded motor and gear mounting blocks assembly.
Figure 7:
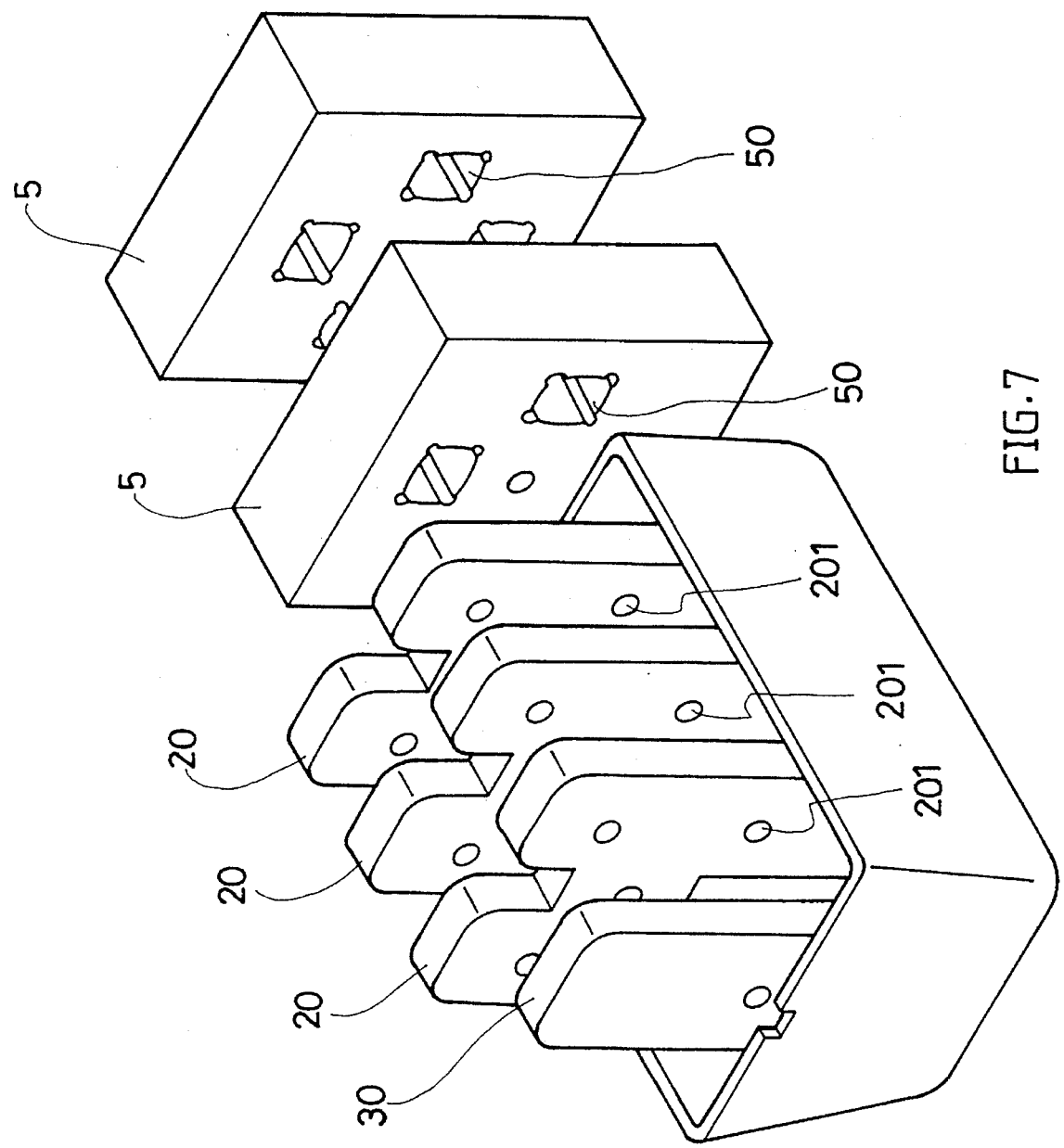
FIG. 7 is a diagram showing the integrally molded gear mounting blocks and motor mounting blocks of the present invention.
Figure 12:
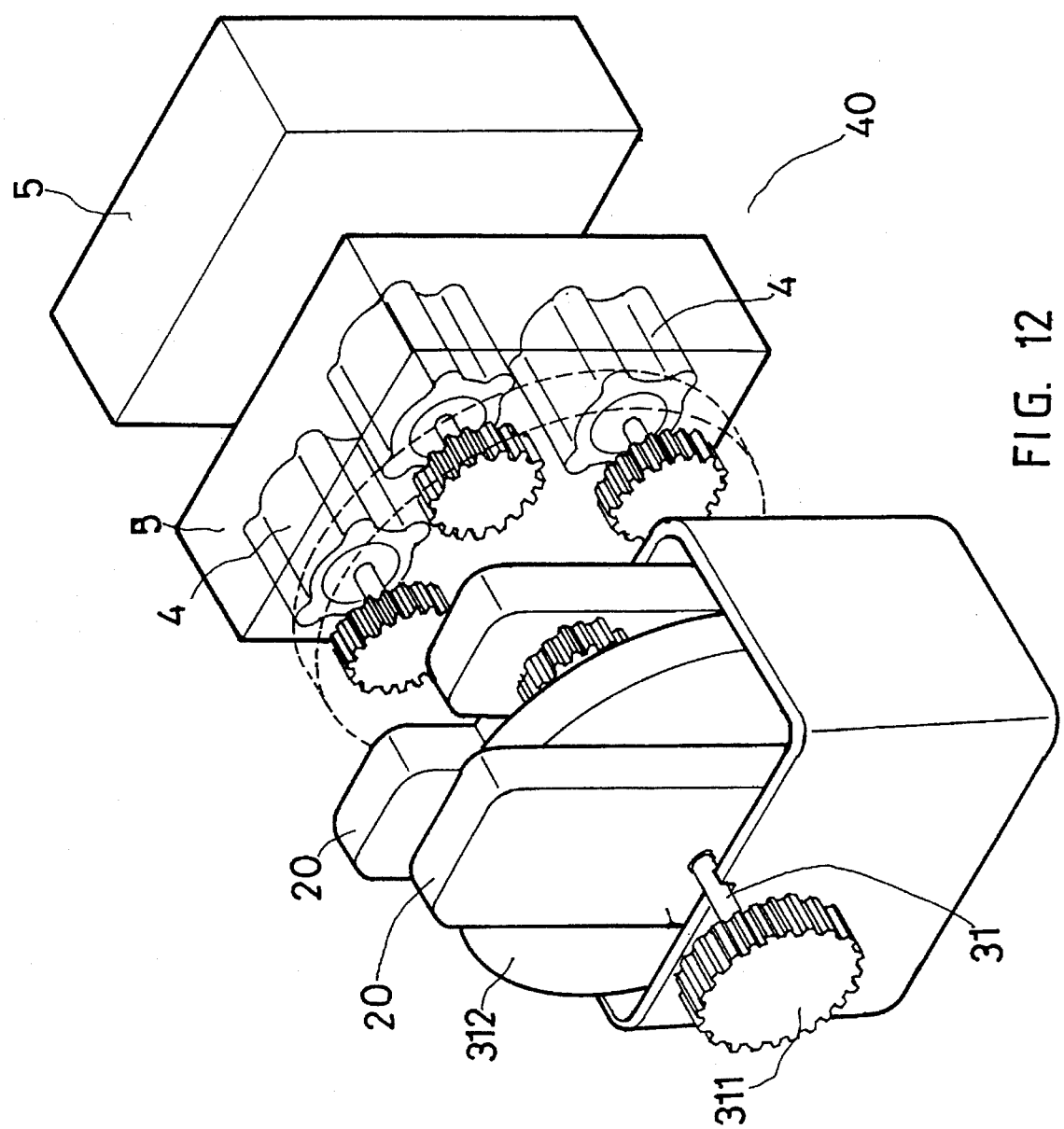
FIG. 12 is a diagram showing two motor assemblies being coupled together by a coupling means.
Figure 13:
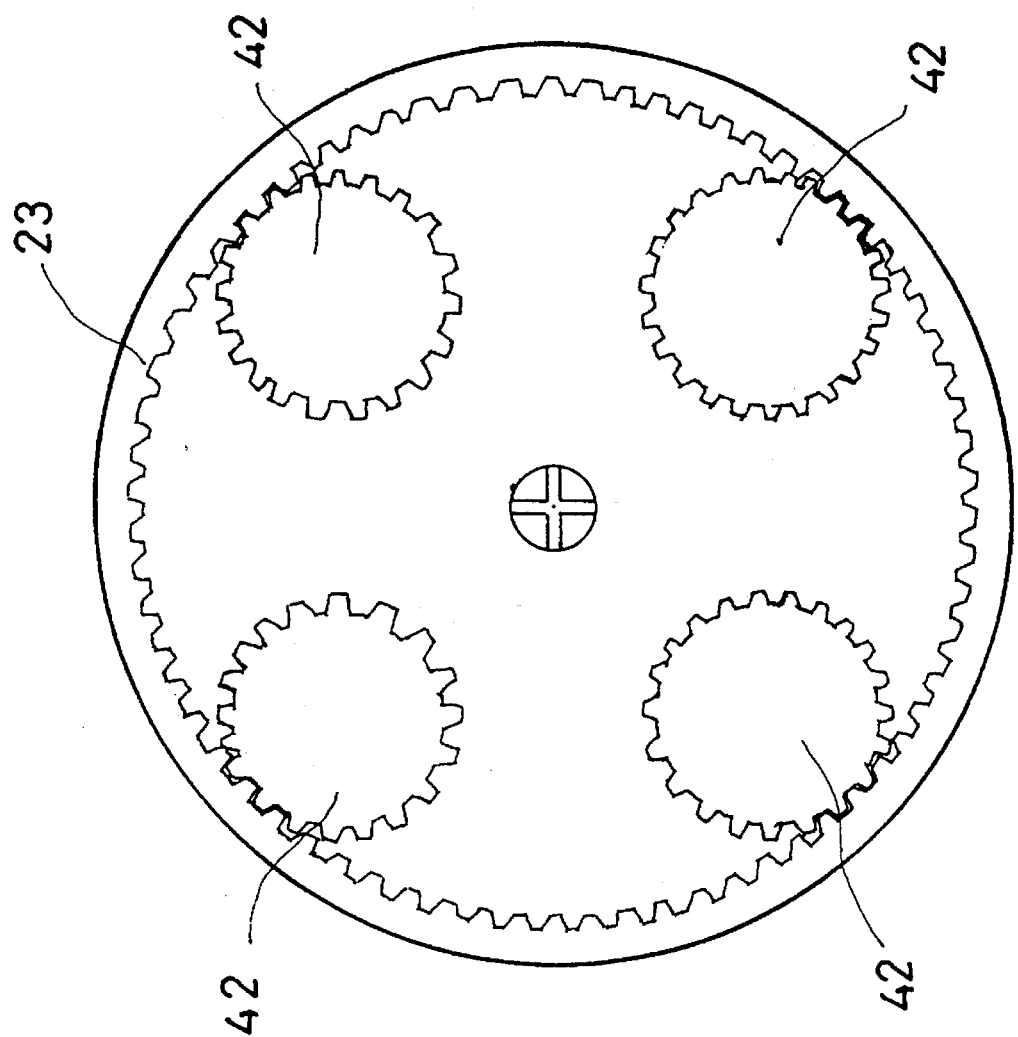
FIG. 13 is a diagram showing the engagement of the gears of a motor assembly with an annular gear of a down-speed gear set.

The miniature electric motor 4 is characterized in that it runs at relative high speed, at least 4000 rpm but it can produce relatively smaller torque than conventional motors. Referring to FIGS. 12, 13, and 6, in practical operation, 4 motors 4 are engaged with the spur gear 25 or the annular gear 23 of the down-speed gear set 2.

Figure 5:
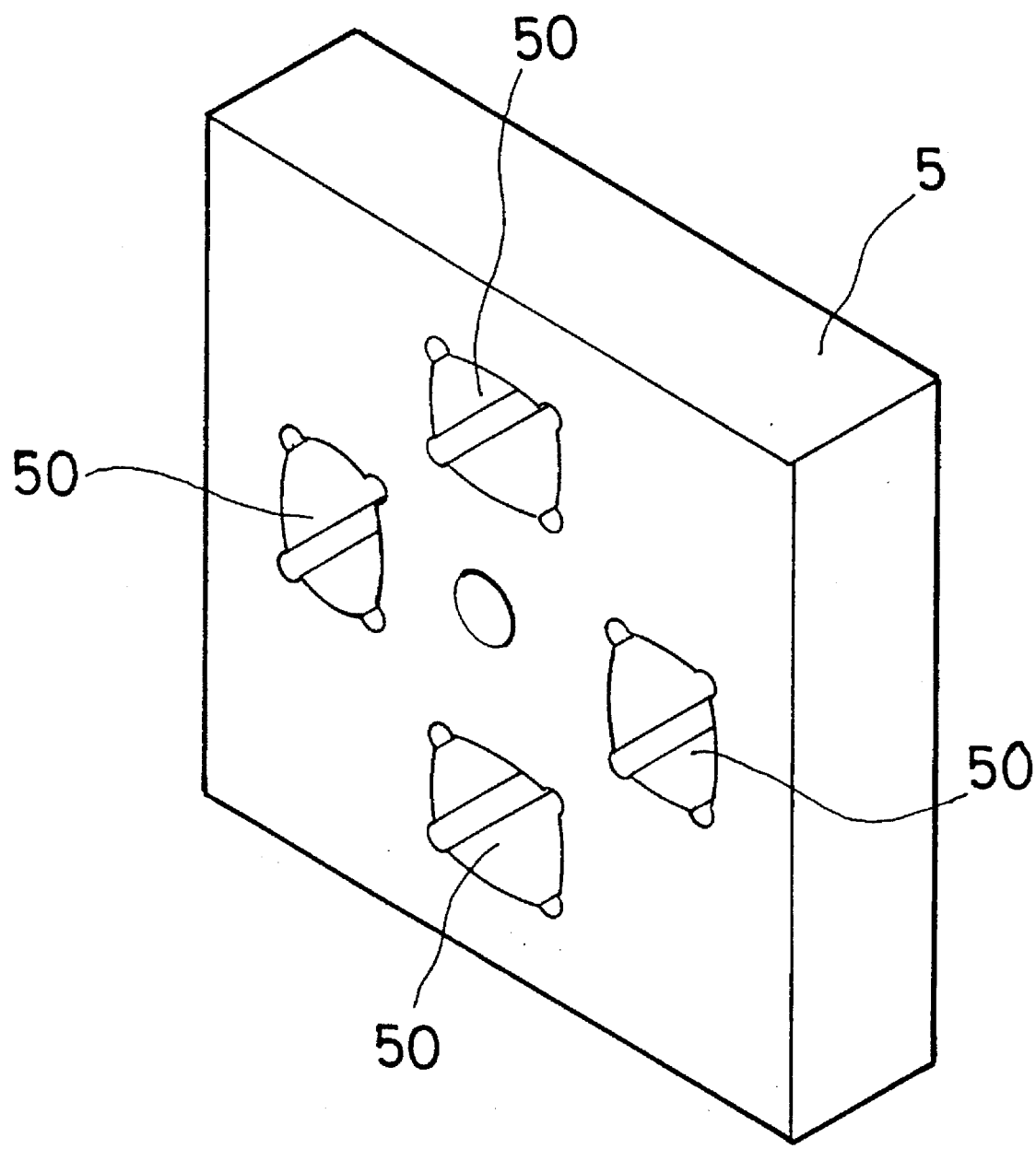
FIG. 5 is a diagram showing a motor mounting block.

Since each miniature electric motor 4 is operated with high speed and small torque, it is difficult to apply such motor to heavy duty electric appliance, such as washing machines, refrigerators, or electric cars. To get this problem solved, a plurality of such electric motors 4 can be assembled together onto a motor mounting block 5 having a plurality of motor mounting holes 50 (as shown in FIG. 5) to form a motor assembly so as to effectively increase the output torque.

Figure 3:
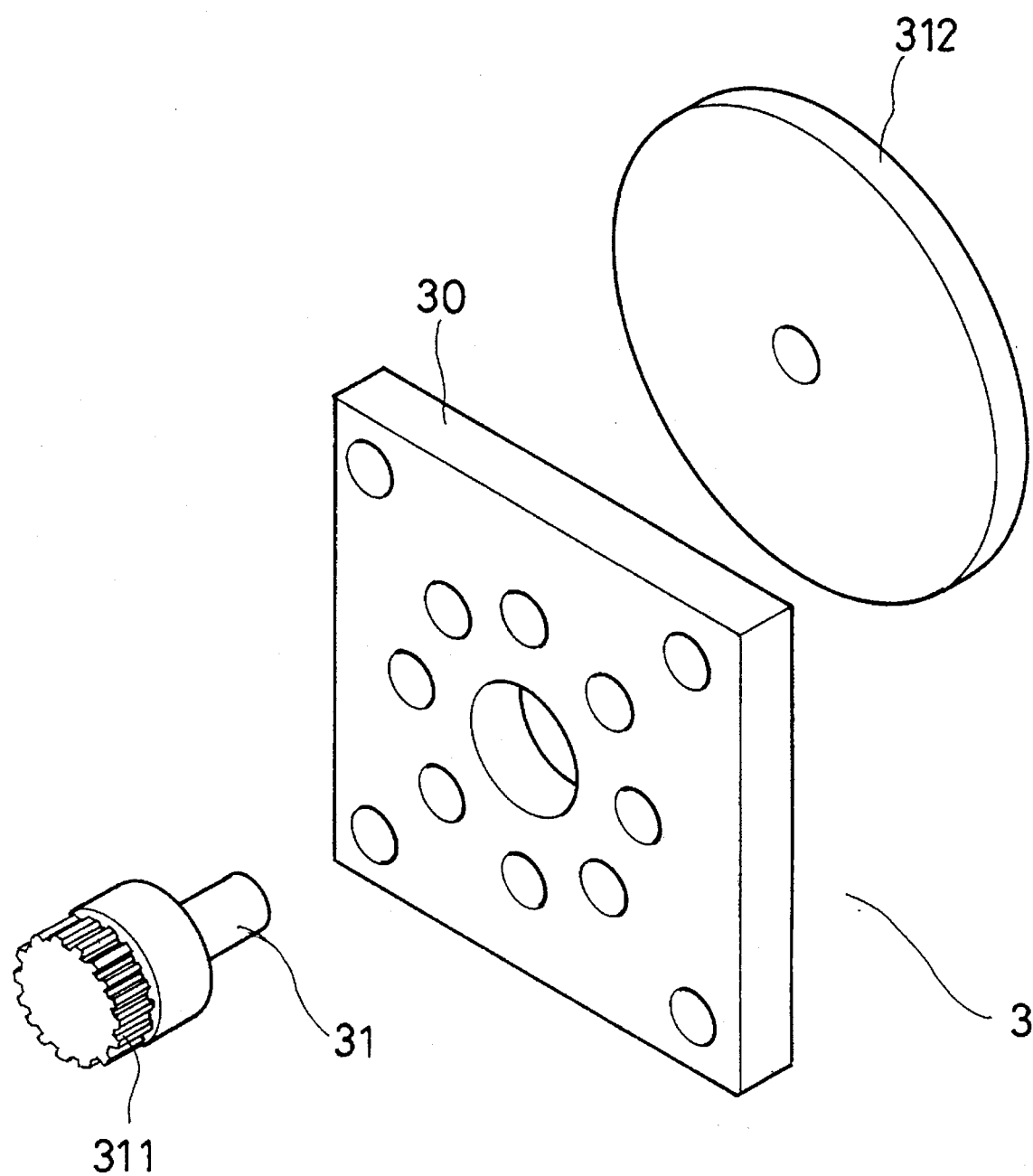
FIG. 3 is a perspective diagram showing the structure of an output gear set.
Figure 3A:
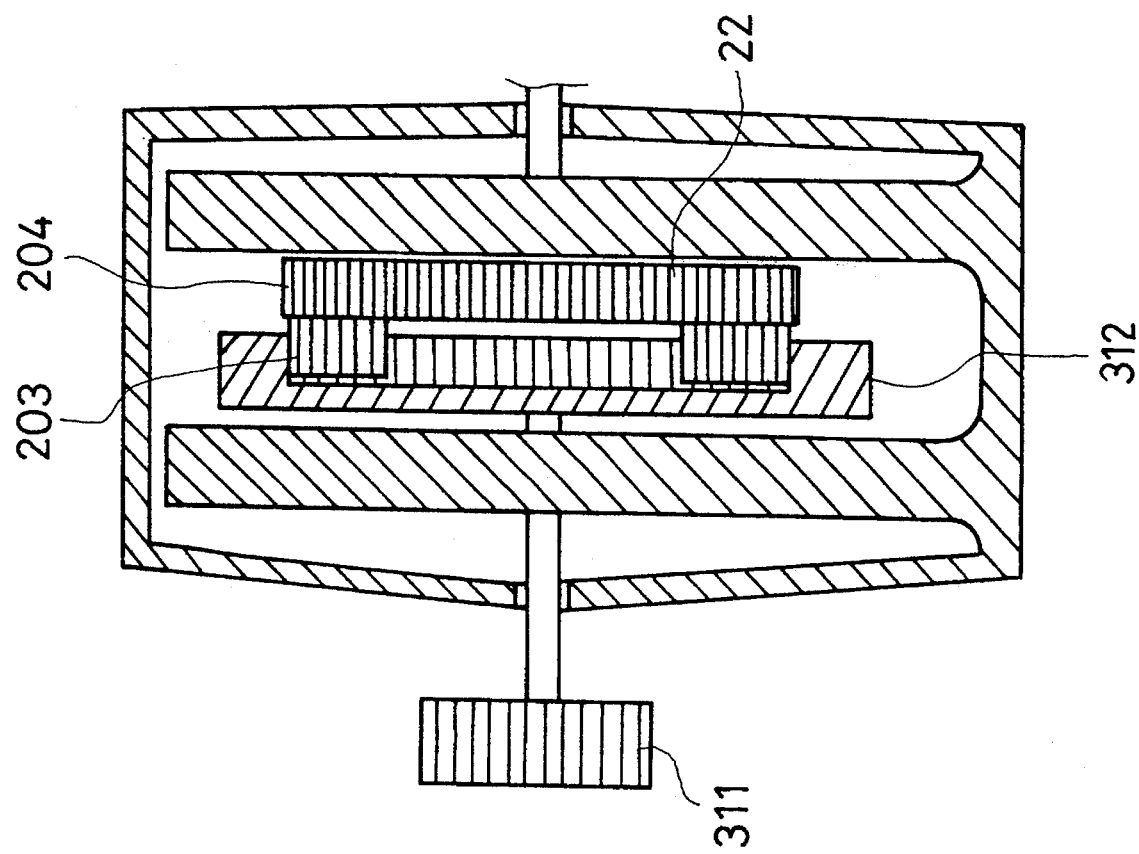
FIG. 3A is a sectional view showing the operational engagement of the down-speed gear set and the output gear set.
Figure 4:
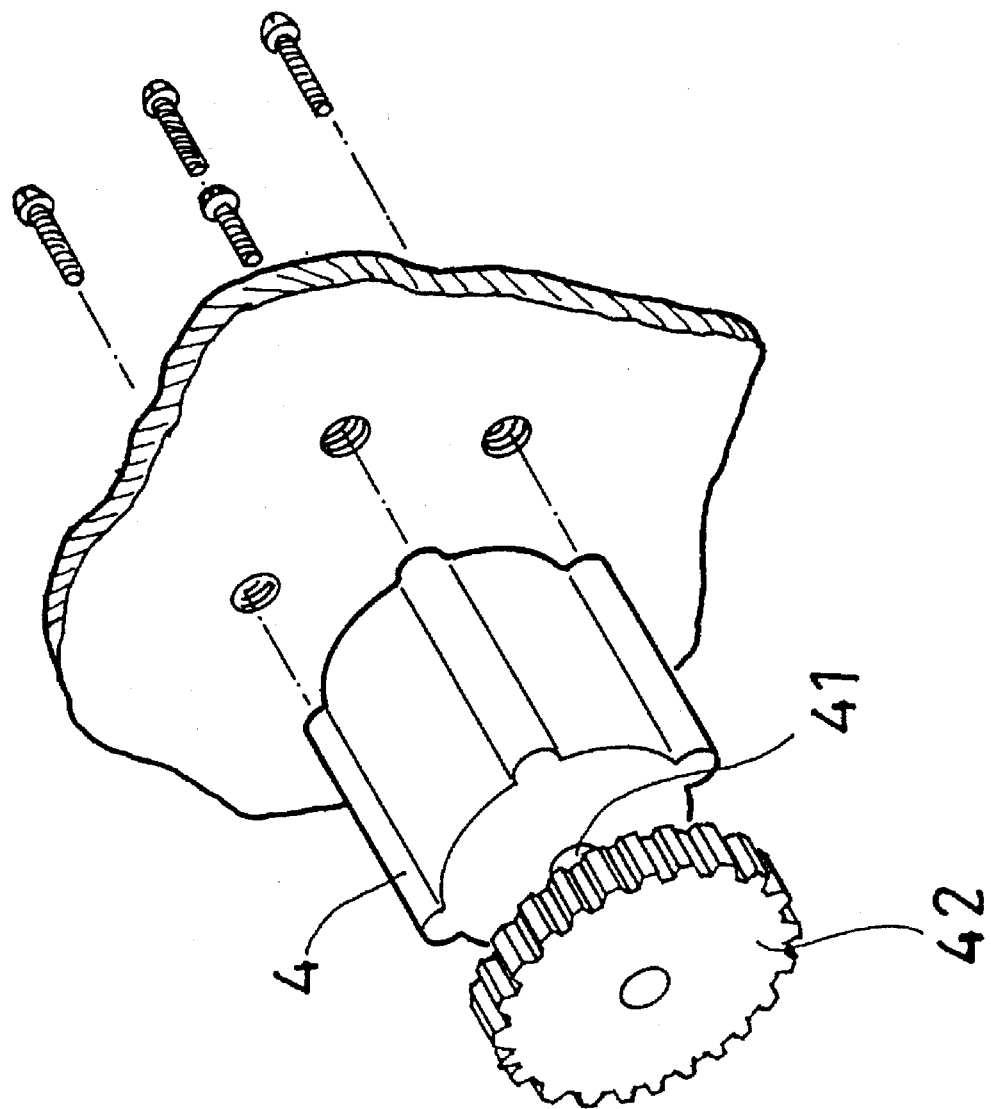
FIG. 4 is a diagram showing the structure of a miniature motor.
Figure 12A:
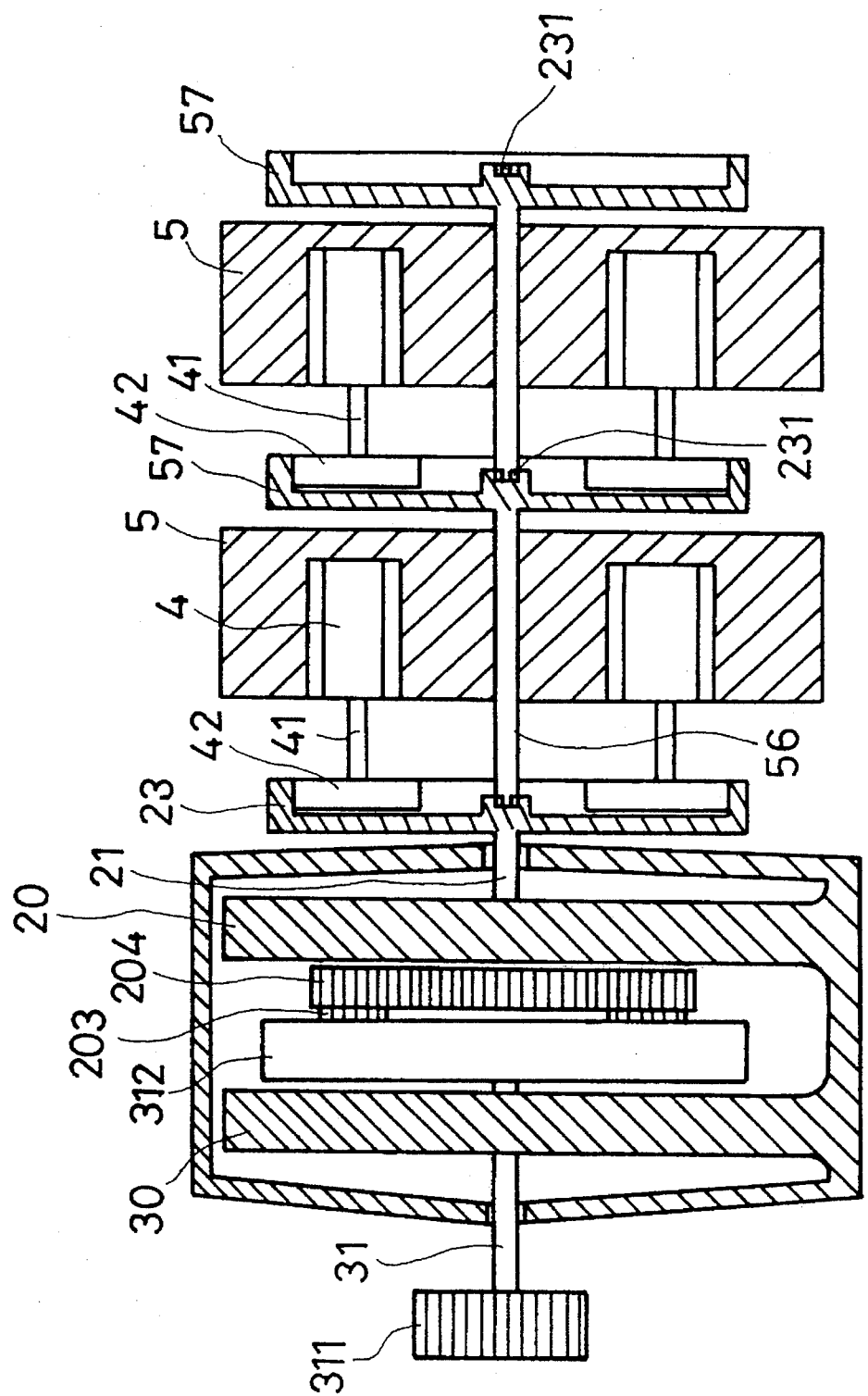
FIG. 12A is a sectional view of FIG. 12 showing the use of the coupling means as shown in FIG. 11.
Figure 12B:
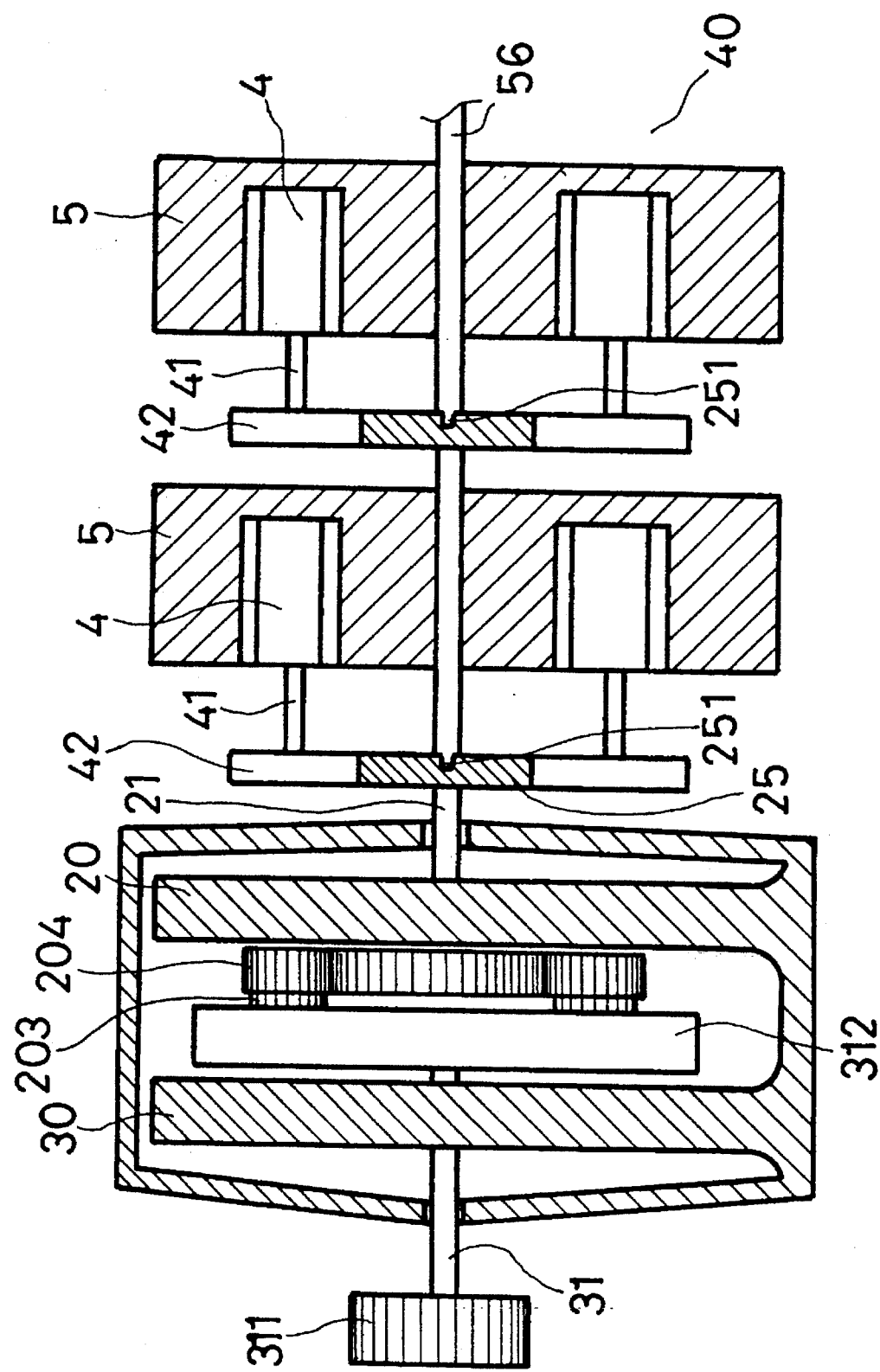
FIG. 12B is a sectional view of FIG. 12 showing the use of another coupling means as shown in FIG. 11A.

Each high-speed miniature motor 4 is provided with an output shaft 41 having a spur gear 42 attached at the end thereof which is engaged with the annular gear 23, as shown in FIG. 12A or the spur gear 25, as shown in FIG. 12B, of the down-speed gear set 2 so as to drive the main driving shaft 21 of the down-speed gear set 2. In the meanwhile, as shown in FIG. 3A, the spur gear 22 at the other end of main driving shaft 21 is engaged with the second idle gears 204 of the minor driving shafts 202, with the first idle gear 203 engaged with an annular gear 312 of the output gear set 3 or another annular gear 23 of the down-speed gear set 2 in sequence simultaneously. Therefore, the motors 4 of the motor assembly can drive the main driving shaft 21 by way of the annular gear 23 or in another case, the spur gear 25; and the spur gear 22 at the other end of the main driving shaft 21 will drive the second idle gears 204 and the first idle gears 203 simultaneously.

Figure 8:
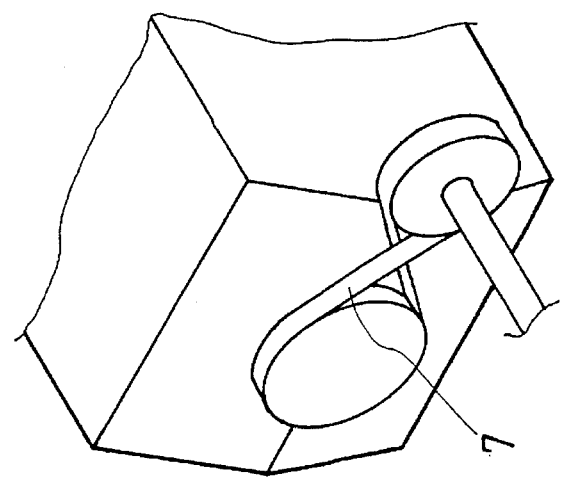
FIG. 8 is a diagram showing the output gear set connected to a belt operated device.
Figure 9:
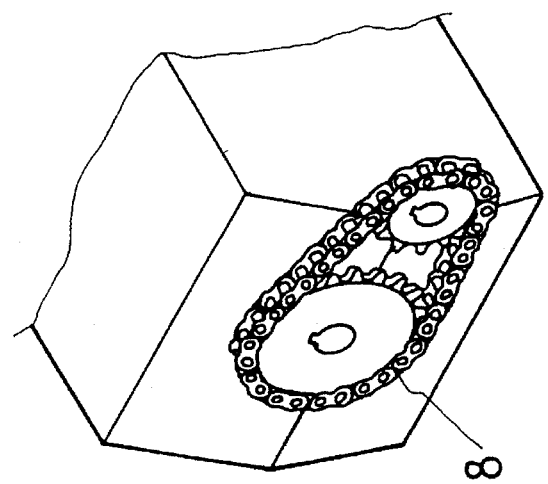
FIG. 9 is a diagram showing the output gear set connected to a chain driven device.
Figure 10:
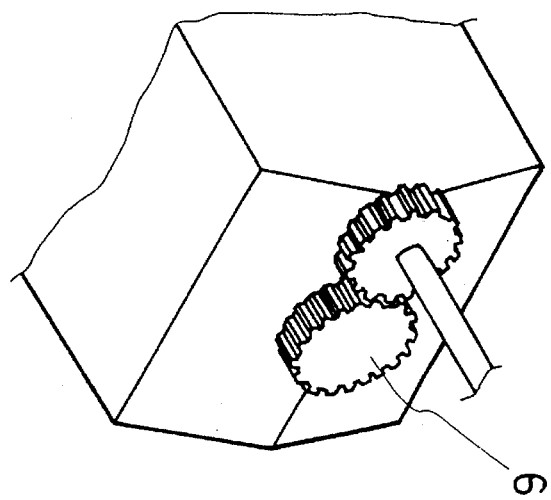
FIG. 10 is a diagram showing the output gear set connected to a gear driven device.
Figure 11A:
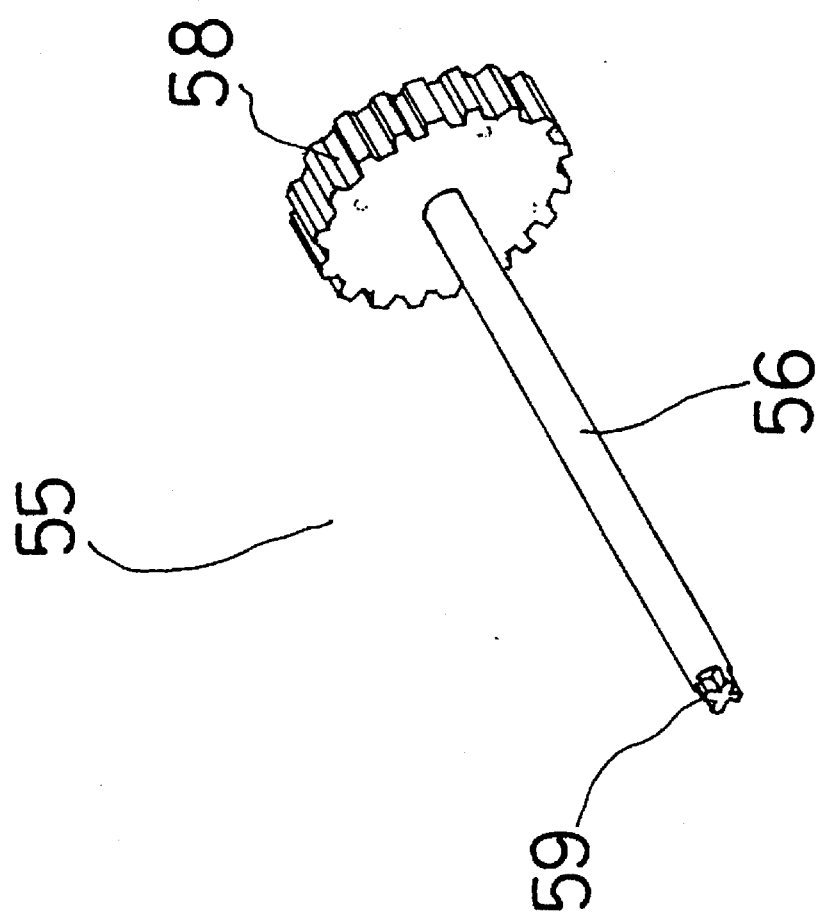
FIG. 11A is a diagram showing the structure of another coupling means.

Referring to FIGS. 12A and 12B, then, the driven first idle gears 203 are powered to actuate the annular gear 312 disposed at one end of the main output shaft 31 of the output gear set 3. The spur gear 311 at the other end of the main output shaft 31 of the output gear set 3 of the whole assembly is then engaged with a motor driven device such as a pump, a compressor, a power transmission or device of the like, by way of a belt 7, a chain 8 or a gear 9, as shown in FIGS. 8, 9, 10.

As further shown in FIGS. 7, 12, 12A, 12B, the mounting blocks 20, 30, 5 of the down-speed and output gear sets 2, 3 and motor assemblies 40 can be integrally preformed as one by way of injection molding. The number of mounting blocks used can be varied in accordance with different working requirements so as to permit the present transmission mechanism to be applied to different motor operated devices with ease.

Referring further to FIGS. 11, 11A, 12A, 12B, to effectively increase the power output of the present invention, a number of motor assemblies 40 each of which includes a plurality of miniature motors 4 can be coupled together one by one by a respective coupling means 55 having a coupling shaft 56 having one end attached with an annular gear 57 or a spur gear 58 and the other end with a male joint 59 which is engaged with a female cavity 231, or 251 disposed respectively at the center of each annular gear 23 or spur gear 25 of the down-speed gear set 2. Thus, the motor assemblies can output power simultaneously. With such an arrangement, the present invention can be applied to a wide range of fields, providing different kinds of driving capability according to practical requirements.

It becomes clear that the present invention effectively advances the operational efficiency of a motor driven device when a number of experiment results are given as follows.

An equation for calculating the torque of a general motor is shown as below:

$$T = \frac{716.2 \times HP}{N}$$

Wherein T stands for torque,
HP stands for horse power,
N stands for rev./min.

In general, for conventional motors of 1 HP and 3 HP, the power consumptions are 746 W/H and 2238 W/H. These motors can be operated at high speed with low output torque or operated at low speed with larger torque, no matter how it operates, the power consumptions thereof are respectively 746 W/H and 2238 W/H.

In comparison, when a DC 12 V mini motor with full load capacity 25 g, 560 mA, running at 13340 rev./min is used, a plurality of such motors can be assembled and operated in association with a suitable number of down-speed gear sets so as to obtain proper operation speed. The power consumptions thereof in the same conditions as above, are compared with the conventional motors to conclude that at most only one eleventh of the power consumed in above cited motors is required.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

I claim:

1. A multi-function energy saving power transmission mechanism, comprising:
    at least one electric motor assembly having more than one motor mounted to a motor mounting block;

at least one down-speed gear set;

an output gear set having a main output shaft with a spur gear at one end and an annular gear at another end;

said electric motor assembly being engaged with said down-speed gear set; and said down-speed gear set being engaged with said output gear set which is then connected to a motor driven appliance;

wherein each said down-speed gear set further comprises:

a gear mounting block;

a main driving shaft having a first gear means at one end and a second gear means at an opposite end thereof being mounted at the center of said gear mounting block;

a plurality of symmetric gear mounting holes disposed about said central main driving shaft;

a plurality of minor driving shafts each having a first and second idle gear means disposed at one end thereof being mounted to said gear mounting holes;

said second idle gear means being engaged with said first gear means disposed at the end of said main driving shaft of said down-speed gear set;

said first idle gear means being engaged with said annular gear means of said main output shaft of said output gear set.

2. The transmission mechanism as claimed in claim 1 wherein more than one of said down-speed gear set is engaged with each other in sequence so as to effectively reduce the output speed of said motor assembly.

3. The transmission mechanism as claimed in claim 2 wherein each said down-speed gear set further comprises:

a gear mounting block;

a main driving shaft having a first gear means at one end and a second gear means at the opposite end thereof being mounted at the center of said gear mounting block;

a plurality of symmetric gear mounting holes disposed about said central main driving shaft;

a plurality of minor driving shafts each having a first and second idle gear means disposed at one end thereof being mounted to said gear mounting holes;

said second idle gear means being engaged with said first gear means disposed at the end of said main driving shaft of said down-speed gear set;

said first idle gear means being engaged with said annular gear means of said main output shaft of said output gear set.

4. The transmission mechanism as claimed in claim 3 wherein said minor driving shafts are selectively mounted to said gear mounting holes of said gear mounting block.

5. The transmission mechanism as claimed in claim 3 wherein said first and second idle gear means are identical in number of teeth and the diameter thereof.

6. The transmission mechanism as claimed in claim 5 wherein said first and second idle gear means are variant in number of teeth and the diameter thereof.

7. The transmission mechanism as claimed in claim 1 wherein said minor driving shafts are selectively mounted to said gear mounting holes of said gear mounting block.

8. The transmission mechanism as claimed in claim 1 wherein said first and second idle gear means are identical in number of teeth and the diameter thereof.

9. The transmission mechanism as claimed in claim 1 wherein said first and second idle gear means are variant in number of teeth and the diameter thereof.

10. The transmission mechanism as claimed in claim 1 wherein said motor assembly includes at least one motor which is equipped with a gear means at the end of the output shaft of said motor that is engaged with the second gear means of said main driving shaft of said down-speed gear set.

11. The transmission mechanism as claimed in claim 1 wherein said motor assembly has a motor mounting block for selective securing of said miniature motors thereto.

12. The transmission mechanism as claimed in claim 11 wherein said motor mounting block and said gear mounting blocks of said down-speed, gear set and said output gear set are integrally formed together by injection molding in any number preferred, permitting the same to be adapted for various operation conditions.

13. The transmission mechanism as claimed in claim 12 wherein said injection molded gear mounting blocks are formed in different shapes so as to meet various working requirements.

14. The transmission mechanism as claimed in claim 1 wherein each said motor assembly includes a plurality of motors; and more than one motor assembly are operationally coupled together by coupling means so as to effectively increase the output power thereof.

15. The transmission mechanism as claimed in claim 14 wherein said coupling means has a coupling shaft led through the center of said motor mounting block; said shaft has a gear means at one end which is engaged with the output gear means of said motors of an adjacent said motor assembly and a joint means at the other end which is engaged with an adjacent joint cavity of an adjacent said down-speed gear set or with an adjacent joint cavity disposed at the center of said gear means of said coupling means.

16. The transmission mechanism as claimed in claim 15 wherein said gear means of said coupling means is an annular gear.

17. The transmission mechanism as claimed in claim 15 wherein said gear means of said coupling means is a spur gear.

18. The transmission mechanism as claimed in claim 18 wherein said second gear means of said main driving shaft of said down-speed gear set is an annular gear.

19. The transmission mechanism as claimed in claim 1 wherein said second gear means of said main driving shaft of said down-speed gear set is a spur gear.

* * * * *